Figure 1:
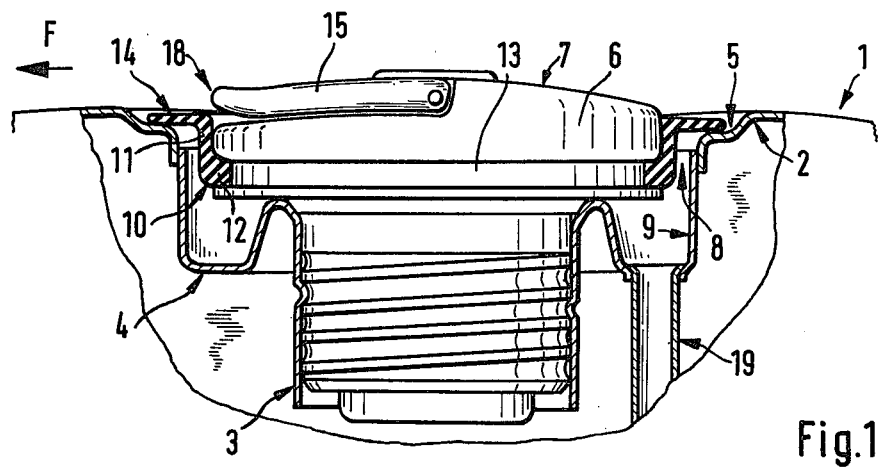

United States Patent [19]

Muth et al.

[11] 4,099,645
[45] Jul. 11, 1978

[54] FUEL TANK, ESPECIALLY FOR MOTORCYCLES

[75] Inventors: Hans-Albrecht Muth, Hechendorf, Pilsensee; Dirk Reissig, Schweitenkirchen; Hans-Günther v.d. Marwitz, Munich, all of Fed. Rep. of Germany

[73] Assignee: Bayerische Motoren Werke Aktiengesellschaft, Fed. Rep. of Germany

[21] Appl. No.: 794,386

[22] Filed: May 6, 1977

[30] Foreign Application Priority Data

May 26, 1976 [DE] Fed. Rep. of Germany ... 7616881[U]

[51] Int. Cl.² .................... B65D 51/16; B65D 53/02
[52] U.S. Cl. .............................. 220/304; 220/86 R; 220/208; 220/209
[58] Field of Search ............ 220/86 R, 86 F, 303, 220/203, 208, 209, 241, 242, DIG. 32, DIG. 33, 304, 366, 288; 137/854, 860; 277/212 F, 212 C; 141/301, 302, 326; 285/204, 212, 220, 13; 280/5 A

[56] References Cited

U.S. PATENT DOCUMENTS

| | | | |
|---|---|---|---|
| 1,499,364 | 9/1924 | Goodrick | 220/366 |
| 1,700,091 | 1/1929 | Bruce | 277/212 C |
| 1,717,428 | 6/1929 | Weida | 277/212 C |
| 1,738,069 | 12/1929 | Holtson | 220/86 R |
| 1,814,656 | 7/1931 | Anschicks | 220/86 R |
| 2,088,180 | 7/1937 | Stevens | 277/212 R |
| 2,356,327 | 8/1944 | Lebus | 220/86 R |
| 2,466,076 | 4/1949 | Bentley et al. | 220/86 R |
| 3,108,514 | 10/1963 | Gordon | 277/212 C |
| 3,467,274 | 9/1969 | Schmitt | 220/86 R |
| 3,820,680 | 6/1974 | Friend | 220/303 |

*Primary Examiner*—William Price
*Assistant Examiner*—Allan N. Shoap
*Attorney, Agent, or Firm*—Craig & Antonelli

[57] ABSTRACT

A fuel tank for single-track vehicles, especially motorcycles, with a filler connection arranged recessed in the tank wall which is connected with the tank wall by way of an annular channel and is closed off by a recessed cover; the closure cover is thereby constructed flush with the contours of the tank wall in the closing position while a gap between the closure cover and an outer annular channel or tank wall is covered off by means of a ring of soft elastic material.

16 Claims, 2 Drawing Figures

FUEL TANK, ESPECIALLY FOR MOTORCYCLES

The present invention relates to a fuel tank for single-track vehicles, especially for motorcycles, with a filler connection arranged recessed in the tank, which is connected with the tank wall by way of an annular channel and is closed off by a cover arranged recessed.

Such a fuel tank is disclosed in the German Gebrauchsmuster No. 1,662,911. In one embodiment illustrated therein, the extent of the recess and the height of the filler connection are so selected that a flat closure cover for the filler connection is arranged recessed in the tank wall with respect to the edge of the recess in the closing position. For purposes of achieving a closed tank wall, the recess is covered off by means of a disk of slight thickness. The cover disk abuts along its edge on the end face of the section of the annular channel connected with the tank wall and is retained by way of elastic holding means pressing against this section. The cover disk further includes an aperture which serves for the introduction of a stiff object, above all of an ignition key of the motorcycle, for the removal of the cover disk.

The essential disadvantage of the described locking mechanism resides in its complicated handling before and after the filling of the fuel tank, whereby especially prior to the filling the ignition key, the cover disk and the closure cover have to be handled or actuated separately.

It is additionally of disadvantage that fuel condensate can precipitate along the inside of the cover disk, which stems from the venting of the fuel tank that takes place by way of the closure cover, and/or from fuel residues out of the collecting space formed by the annular channel for splashing-over fuel. Dust added to the fuel condensate by way of the aperture in the cover disk may lead to a very disagreeable soiling of the hands or of clothing pieces during the handling of the cover disk.

A further disadvantage also resides in the fact that the cover disk becomes unsightly in the area about the aperture by reason of the handling by means of the ignition key. Finally, also the end face at the section of the annular channel which serves as abutment for the cover disk has to be cleaned continuously in order to achieve a flush abutment of the cover disk. Moreover, the handling of the closure cover in the recess is rendered considerably difficult by an excessively low handle element.

The present invention is now concerned with the task to provide for a fuel tank of the aforementioned type, a closure mechanism without the aforementioned disadvantages whereby the closure mechanism also is to be constructed to comply with the requirement resulting from the safety regulations for a smooth surface of the tank wall.

The underlying problems are solved according to the present invention in that the closure cover is constructed flush with the contour of the tank wall in the closing position and a gap between the closure cover and an outer annular channel wall or tank wall is covered off by means of a ring of soft elastic material.

According to one embodiment of the present invention, it is proposed according to several features that the ring is arranged form-lockingly at the circumference of the closure cover and includes an essentially radially projecting sealing lip which, when screwing-in the closure cover into the filler pipe, closely joins or adapts itself with its bottom side to a shoulder or offset arranged in the tank wall concentrically to the recess or the annular channel. The closure cover is equipped with a bow-shaped member adapted to be uprighted as handle element which is the non-use position lies within the contour of the outer surface of the closure cover.

A simplified handling before and after the filling of the fuel tank is attained in an advantageous manner by means of the closure mechanism constructed in accordance with the present invention because with the present invention only the closure cover has to be actuated and more particularly only as in the usual manner. The ring which in conjunction with the closure cover completely covers the recess is rigidly arranged at the closure cover, as a result of which also the entry of dirt and water into the recess is prevented. Manufacturing tolerances can be compensated for in a simple manner by means of the sealing lip elastically closely adjoining and following a corresponding abutment surface of the tank. Finally, the bow-shaped member represents in its upright position a handle element for the actuation of the closure cover which can be seized readily and favorably by hand, especially by a glove-covered hand.

Figure 2:
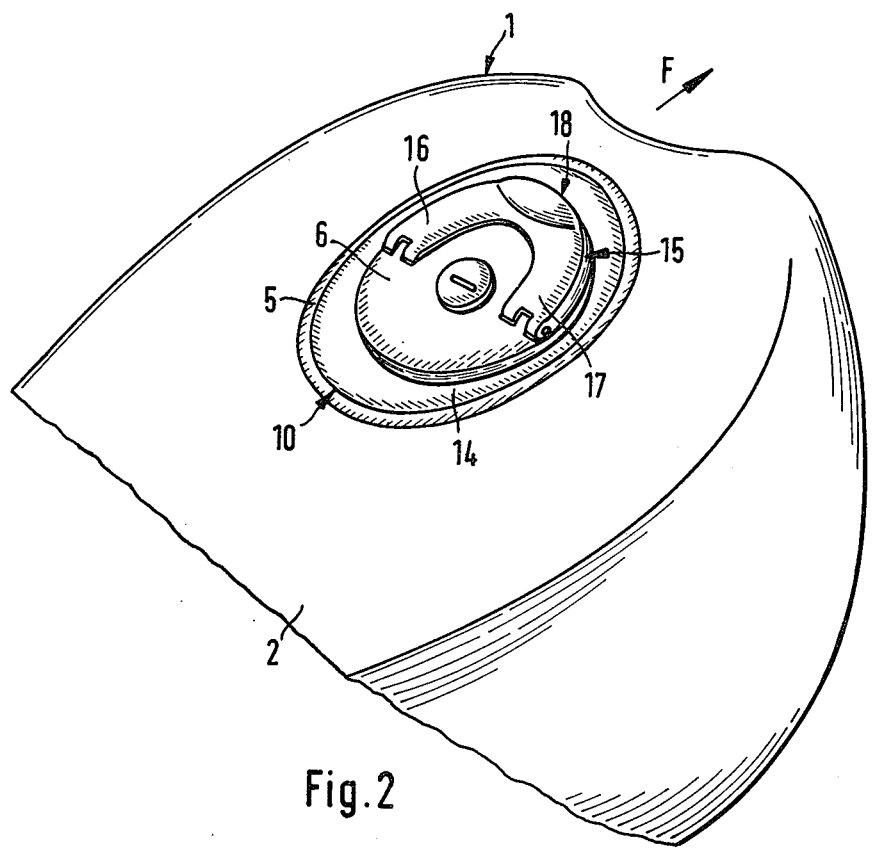

These and other objects, features and advantages of the present invention will become more apparent from the following description when taken in connection with the accompanying drawing which shows, for purposes of illustration only, one embodiment in accordance with the present invention, and wherein:

FIG. 1 is a cross-sectional view through a fuel tank closure arrangement in accordance with the present invention; and FIG. 2 is a perspective view from above on the closure cover in accordance with the present invention.

Referring now to the drawing wherein like reference numerals are used throughout the two views to designate like parts, FIG. 1 illustrates a fuel tank generally designated by reference numeral 1 for a motorcycle, which is only illustrated in part. The fuel tank 1 includes a filler connection 3 arranged recessed in the upper tank wall 2. The filler connection 3 is connected with the tank wall 2 by way of an annular channel 4. The filler connection 3 and the annular channel 4 may be constructed as a single, one-piece shaped part. An offset or shoulder 5 is arranged in the tank wall 2, which is concentric to the annular channel 4.

The filler connection 3 is closed by a cover 6 arranged recessed with respect to the tank wall 2. The closure cover 6 is so constructed at its outer surface 7 that in the closing position it is flush by way of the outer surface 7 thereof with the contour of the tank wall 2. A gap 8 between the closure cover 6 and an outer annular channel wall 9 is covered off by a ring 10 of soft elastic material. The ring 10 is preferably made of rubber and arranged at the closure cover 6. The ring 10 includes a section 11 abutting at the circumference of the closure cover 6, while a projection 12 directed radially to the closure cover 6 for the form-locking engagement in a groove 13 extending circumferentially about the cover circumference is formed integrally with the section 11. Furthermore, the ring 10 includes a sealing lip 14 formed integrally at the section 11, which is directed radially outwardly and cooperates with the offset or shoulder 5 in the tank wall 2. The sealing lip 14 abuts with prestress at the offset or shoulder 5 by way of its bottom side. With its top side, the sealing lip 14 lies within the contour of the tank wall 2.

The closure cover 6 further includes a handle element generally designated by reference numeral 15 which, during non-use is recessed essentially into the contour of the outer surface 7. For example, an essentially U-shaped bow member 15 may be provided as handle element (FIG. 2). The bow-shaped member 15 is pivotally connected at the closure cover 6 in the free end areas of its legs 16 and 17. Preferably, the bow-shaped member 15 is arrested or restrained in both end positions by conventional means. On the one hand, a rattling of the bow-shaped member 15 in the non-use position during the operation of the motorcycle is prevented therewith and, on the other, a completely satisfactory handling of the bow-shaped member 15 is attained during the actuation of the closure cover 6. In the non-used position, the bow-shaped member 15 follows with its outer boundary essentially the circumference of the closure cover 6. In order to be able to engage underneath the bow-shaped member 15 for lifting the same, it is slightly bent out of the contour of the closure cover 6 in the center of its web as indicated at 18. In order that the bow-shaped member 15 can be brought with its handle location at 18 into the driving direction schematically indicated by the arrow F, the closure cover 6 may be constructed as conventional, screw-type cover with overload clutch.

The aforementioned annular channel 4, which is covered off in the upward direction by the closure cover 6 and by the ring 10 according to FIG. 1, may be connected with a drainage pipe 19, which is in communication with the free atmosphere after the fuel tank. Also, the exchange of air and gasoline vapors takes place by way of the drainage pipe 19 when the ring 10 closes tightly and when a venting of the fuel tank takes place by way of the closure cover 6 into the annular channel 4.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A fuel tank for a single-track vehicle, comprising tank wall means, a filler connection means arranged in a recess in the tank wall means, said filler connection means being connected with the tank wall means by way of an annular channel means having inner and outer wall means, said filler connection means being closed by a cover means arranged in said recess, characterized in that the cover means is constructed flush with the contour of the tank wall means in the closing position and is so constructed that when in the closing position the annular channel means is not completely covered by said cover means such that a gap exists between the outer portion of the cover means and one of the means selected from the group consisting of the outer annular channel wall means and the tank wall means, and wherein said gap is covered off by a ring means of soft elastic material having an outer diameter greater than the diameter of the said cover means.

2. A fuel tank according to claim 1, characterized in that the ring means is arranged at the closure cover means.

3. A fuel tank according to claim 2, characterized in that the ring means includes a section abutting at the circumference of the cover means, a projection directed substantially radially to the closure cover means being formed on said section for form-locking engagement in a groove extending about the cover circumference, and said section further including an essentially radially outwardly directed sealing lip means.

4. A fuel tank according to claim 3, characterized in that the tank wall means comprises an inwardly offset portion in said recess, the sealing lip means resting with prestress on said offset portion by way of its bottom side and extending substantially in the contour of the tank wall means with its top side.

5. A fuel tank according to claim 4, characterized in that the closure cover means includes a handle element which, during non-use, is recessed essentially into the contour of the outer surface of the closure cover means.

6. A fuel tank according to claim 5, characterized in that said handle element is an essentially U-shaped bow-shaped member which is pivotally connected in the free end areas of its legs at the closure cover means and is operable to be arrested in its end position.

7. A fuel tank according to claim 6, characterized in that in the non-use position the outer boundary of the bow-shaped member essentially follows the circumference of the closure cover means and in that the center of the web of said bow-shaped member is slightly bent out of the contour of the closure cover means for engaging underneath the same.

8. A fuel tank according to claim 7, characterized in that the closure cover means is constructed as a screw-type cover.

9. A fuel tank according to claim 8, characterized in that the annular channel means and the filler connection means are constructed as 9, one-piece shaped part and the shaped part is connected with the tank wall means underneath the offset portion.

10. A fuel tank according to claim 1, characterized in that the ring means includes a section abutting at the circumference of the cover means, a projection directed substantially radially to the closure cover means being formed on said section for form-locking engagement in a groove extending about the cover circumference, and said section further including an essentially radially outwardly directed sealing lip means.

11. A fuel tank according to claim 10, characterized in that the seaing lip means rests with prestress on the offset portion in the tank wall means by way of its bottom side and extends substantially in the contour of the tank wall means with its top side.

12. A fuel tank according to claim 1, characterized in that the closure cover means includes a handle element which, during non-use, is recessed essentially into the contour of the outer surface of the closure cover means.

13. A fuel tank according to claim 1, characterized in that the closure cover means is equipped with a U-shaped bow-shaped handle element, said handle element being pivotally connected in the free end areas of its legs at the closure cover means and is operable to be arrested in its end positions.

14. A fuel tank according to claim 13, characterized in that in the non-use position the outer boundary of the bow-shaped member essentially follows the circumference of the closure cover means and in that the center of the web of said bow-shaped member is slightly bent out of the contour of the closure cover means for engaging underneath the same.

15. A fuel tank according claim 1, characterized in that the closure cover means is constructed as a screw-type cover.

16. A fuel tank according to claim 1, characterized in that the tank wall means comprises an inwardly offset portion in said recess and in that the annular channel means and the filler connection means are constructed as a one-piece shaped part and the shaped part is connected with the tank wall means underneath the offset portion.

* * * * *